(12) United States Patent
Möller

(10) Patent No.: US 6,247,725 B1
(45) Date of Patent: Jun. 19, 2001

(54) OPENING APPARATUS FOR THE GAS PRESSURE CONTAINER OF AN AIRBAG

(75) Inventor: Tilo Möller, Oberndorf (DE)

(73) Assignee: Welz Industrieprodukte GmbH (DE)

( * ) Notice: Subject to any disclaimer, the term of this patent is extended or adjusted under 35 U.S.C. 154(b) by 0 days.

(21) Appl. No.: 09/508,500

(22) PCT Filed: Sep. 9, 1998

(86) PCT No.: PCT/EP98/05755

§ 371 Date: Mar. 8, 2000

§ 102(e) Date: Mar. 8, 2000

(87) PCT Pub. No.: WO99/12775

PCT Pub. Date: Mar. 18, 1999

(30) Foreign Application Priority Data

Sep. 9, 1997 (DE) .............................................. 197 39 375

(51) Int. Cl.[7] .................................................. B60R 21/26
(52) U.S. Cl. ............................................. 280/737; 137/69
(58) Field of Search .................................. 280/736, 737, 280/741, 742; 137/68.23, 68.19, 69

(56) References Cited

U.S. PATENT DOCUMENTS

| | | | |
|---|---|---|---|
| 3,788,596 | * 1/1974 | Maeda | 280/737 |
| 4,203,616 | * 5/1980 | Okada | 280/737 |
| 4,275,901 | * 6/1981 | Okada | 280/741 |
| 4,289,327 | * 9/1981 | Okada | 280/737 |
| 4,771,914 | * 9/1988 | Kaneda et al. | 222/3 |
| 5,820,162 | * 10/1998 | Fink | 280/742 |

* cited by examiner

Primary Examiner—Paul N. Dickson
(74) Attorney, Agent, or Firm—Robert W. Becker & Asociates

(57) ABSTRACT

An opening apparatus for a gas pressure container for inflating an airbag is provided. A housing is fixedly connected to the container and communicates therewith via a discharge opening. The housing includes a principal member that has oppositely disposed open ends. A sealing element for initially sealing the discharge opening is supported by a pressure piece on a counterbearing against opening forces acting on the sealing element via gas pressure in the container. A triggering device is provided that when activated removes support for the sealing element so that the discharge opening is opened by gas pressure in the container for inflating the airbag. The triggering device is in the form of a separate unit that is independently mountable on the housing and is held n one of the end plates. Support of the sealing element is stable independently of the triggering device.

17 Claims, 6 Drawing Sheets

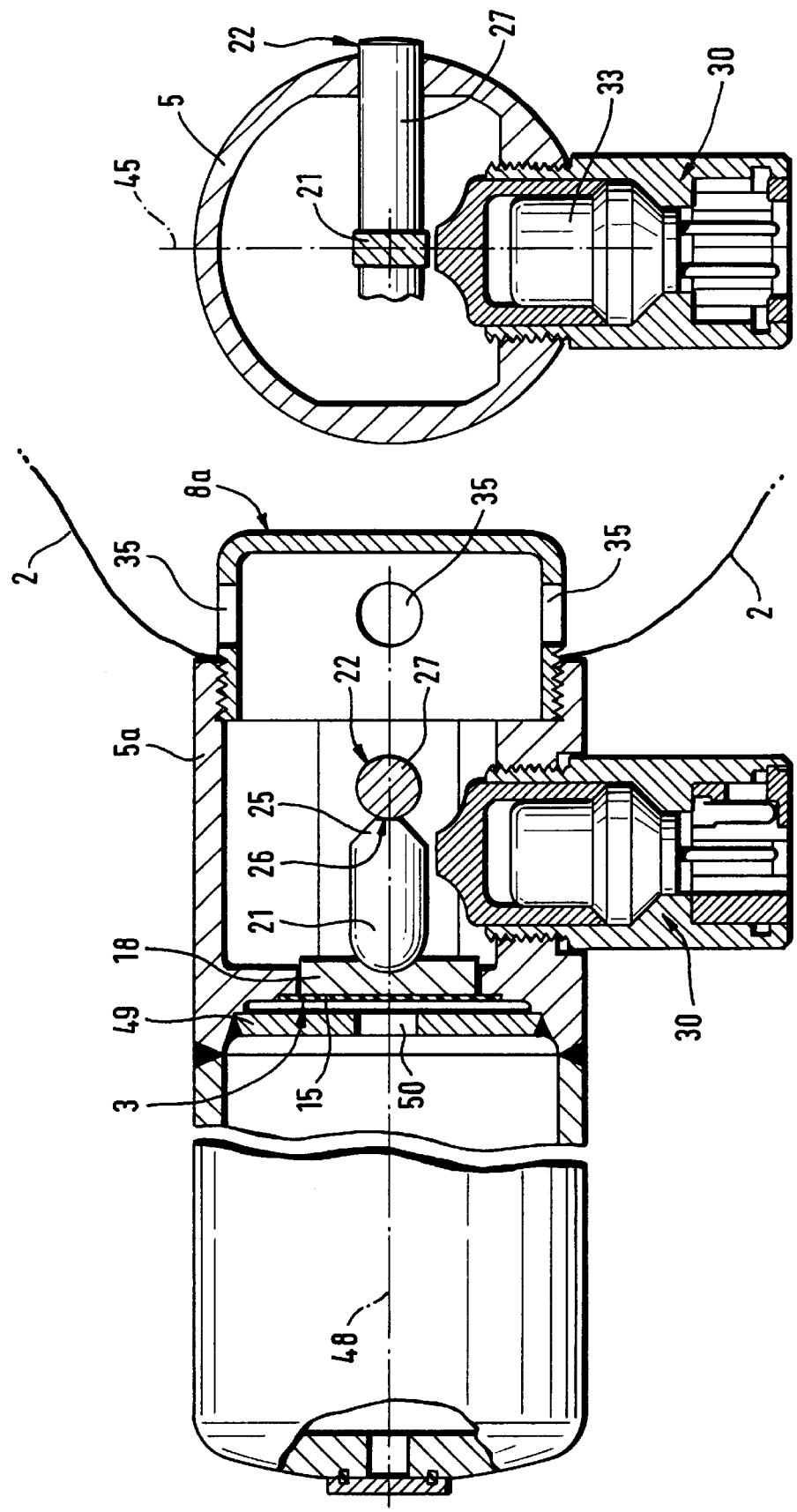

OPENING APPARATUS FOR THE GAS PRESSURE CONTAINER OF AN AIRBAG

BACKGROUND OF THE INVENTION

The invention relates to an opening apparatus for a gas pressure container for inflating an airbag comprising a housing that is securely connected to the container at the discharge opening thereof. A sealing element seals the discharge opening and is supported by a pressure piece on a counterbearing against the opening forces acting on the sealing element via the gas pressure in the container. A tripping device is provided that when tripped or activated removes the support for the sealing element so that the discharge opening is opened by the gas pressure in the container and the airbag is inflated. The support of the sealing element is stable independent of the tripping element.

Such an opening apparatus is known from DE 195 40 618 A1. The discharge opening of the pressure container is closed by means of a sealing element that is supported on a counterbearing fixed in the housing for supporting the gas forces via a pressure member. The pressure member has a pyrotechnic charge that destroys the counterbearing when ignited and thus removes the support for the sealing element. The sealing element is now destroyed by the gas pressure in the container and the airbag attached to the housing is inflated by the gas flowing out.

Known from DE 197 27 047 is filling the gas pressure container with an inert gas, e.g., at least one gas from the nitrogen, argon, and helium group. The gas pressure containers thus filled are closed by a bursting disk that is joined to the gas pressure container and that is opened by the explosion pressure of a pyrotechnic charge.

The filled gas pressure containers are manufactured by suppliers and shipped to end users. The gas pressure containers ready for shipping contain operational opening apparatuses, each comprising a pyrotechnic charge, which is why cautious handling is necessary during manufacture, shipping, and final installation in order to avoid inadvertent actuation of the apparatus.

In addition, it has been determined that gases stored in the gas pressure container must be present in a particular mix in order to ensure rapid and correct inflation of the airbag without mechanical damage.

The object of the invention is to further develop an apparatus of the aforementioned type such that it is assured that the airbag will open immediately regardless of the gases used and without the inflating process causing mechanical damage.

SUMMARY OF THE INVENTION

This object is achieved in accordance with the invention in that the housing, which is open on opposing ends, comprises a principal member that is connected to the pressure container, wherein the open ends can be closed off by end plates, and wherein the tripping or triggering device is in the form of a separate unit that is independently mountable on the housing and is held in one of the end plates.

The throttling means is provided in the direction of discharge of the gases in front of the discharge opening in the gas pressure container, and the reason for this is two-fold. First, the discharge opening can have a large diameter, which means that the gas pressure acts on a correspondingly large surface area and large opening forces are available that provide explosion-type opening of the pressure container when the pressure piece is absent. In contrast, the discharge speed of the gas is determined by the throttling means, which is selected according to the gas filling and installed securely when the container is manufactured. Preferably the pressure container is filled with an inert gas, especially helium or a helium mix, the discharge speed of the gas being constructively pre-determined by the throttling means. Helium is not highly temperature sensitive; its flow speed is high because of its low molecular weight and the flow speed can be adapted with the throttling means to the airbag to be filled.

In a further development of the invention the tripping device embodies a unit separate from the housing that is independently mountable. Since the support for the sealing element is stable independent of the tripping device, the opening apparatus can be preassembled with the gas pressure container without the tripping device. It is useful for the housing to remain open on opposing sides so that if the sealing element is inadvertently opened the gas under pressure flows out of equivalent opening areas on opposing sides and the reaction forces are thus thrust-neutral. Thus the gas pressure container moves only slightly or does not move at all so that a high degree of safety is achieved during pre-assembly, shipping, and final assembly without additional complexity. The tripping device is pre-assembled separate from the opening apparatus and the gas pressure container. The opening apparatus for the gas pressure container is not provided the tripping device until final assembly, when the overall arrangement is made operational. By this time, however, the gas pressure container is securely mounted so that thrust forces that occur due to discharging gases are captured.

Preferably the housing embodies a principal member that is joined to the pressure container and that comprises open ends that can be closed by end plates. The principal member can be closed for shipping by temporary end plates that each have discharge openings equal in size. This can assure that the opening apparatus in the housing is not damaged. The tripping device mounted in one end plate is not attached to the principal member until final assembly, wherein the end plate opposite the tripping device can have the necessary discharge openings for the fill gas for the airbag; it is useful for the airbag to be attached to this end plate.

In order to assure that the tripping device is installed in the correct position, the open edge of the end of the principal member engages in a groove in the end plate.

BRIEF DESCRIPTION OF THE DRAWINGS

Additional features of the invention result from the additional claims, description, and drawing, in which the exemplary embodiments of the invention are described in detail in the following:

FIG. 8 is a partial section through a gas pressure container comprising an end cap opposing the discharge opening;

FIG. 9 is a radial section through the tripping device-in accordance with FIG. 8.

DESCRIPTION OF PREFERRED EMBODIMENTS

Figure 1:
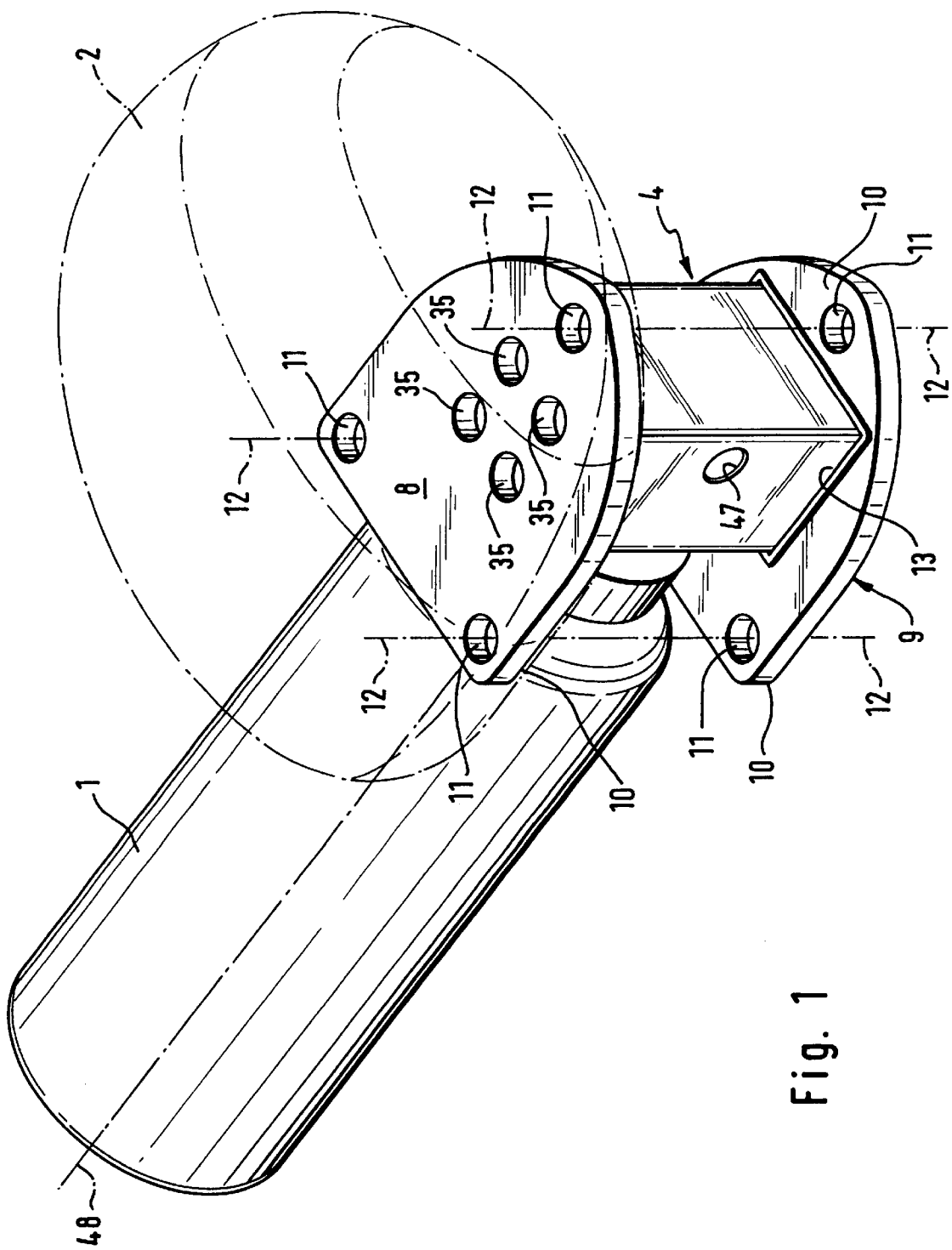
FIG. 1 is a perspective drawing of a gas pressure container comprising an opening apparatus arranged at one end.

The gas pressure container I illustrated in FIG. 1 inflates an airbag 2 as employed, e.g., in motor vehicles.

Figure 2:
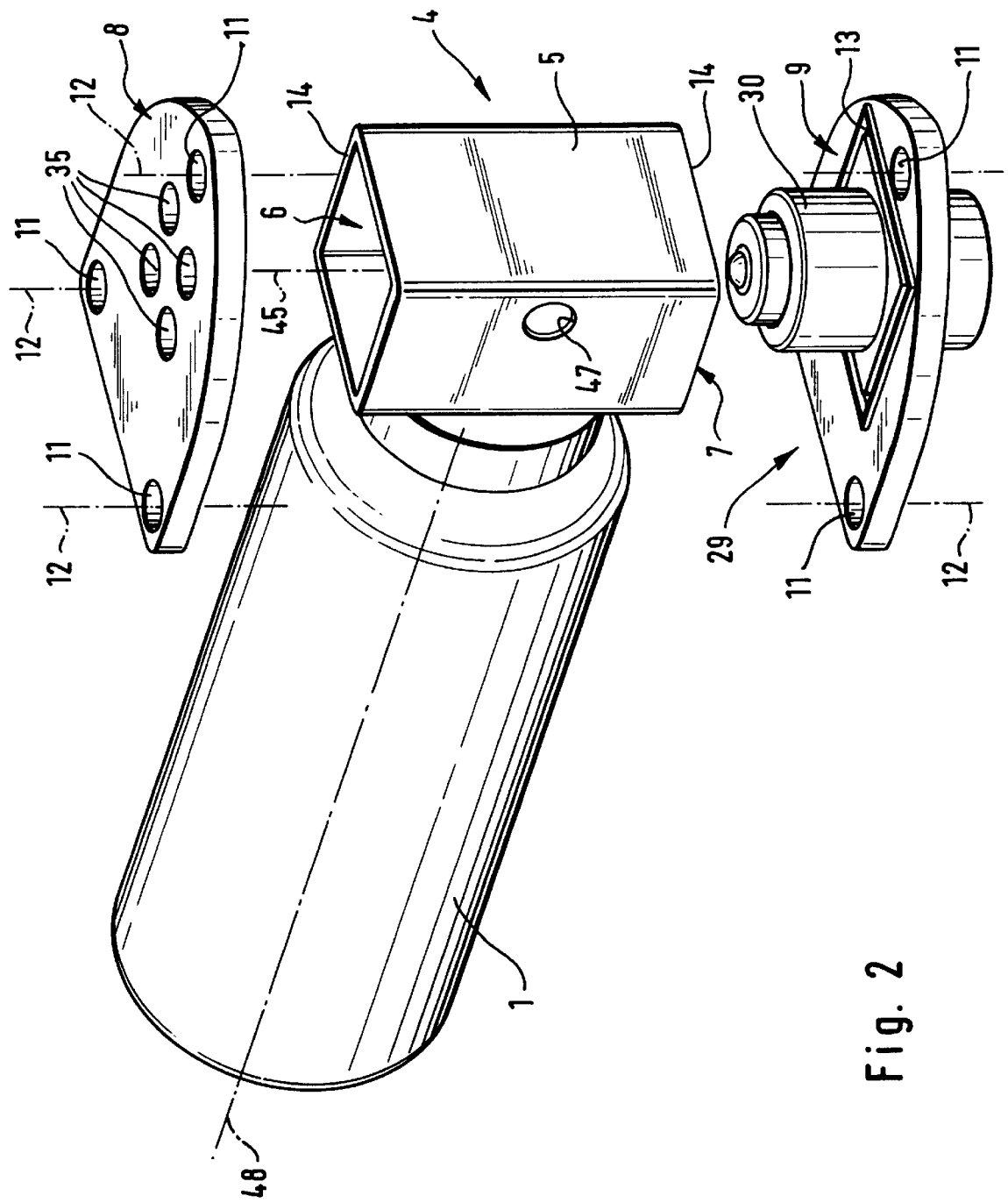
FIG. 2 is a perspective drawing in accordance with FIG. 1 with the opened housing of the opening apparatus.
Figure 3:
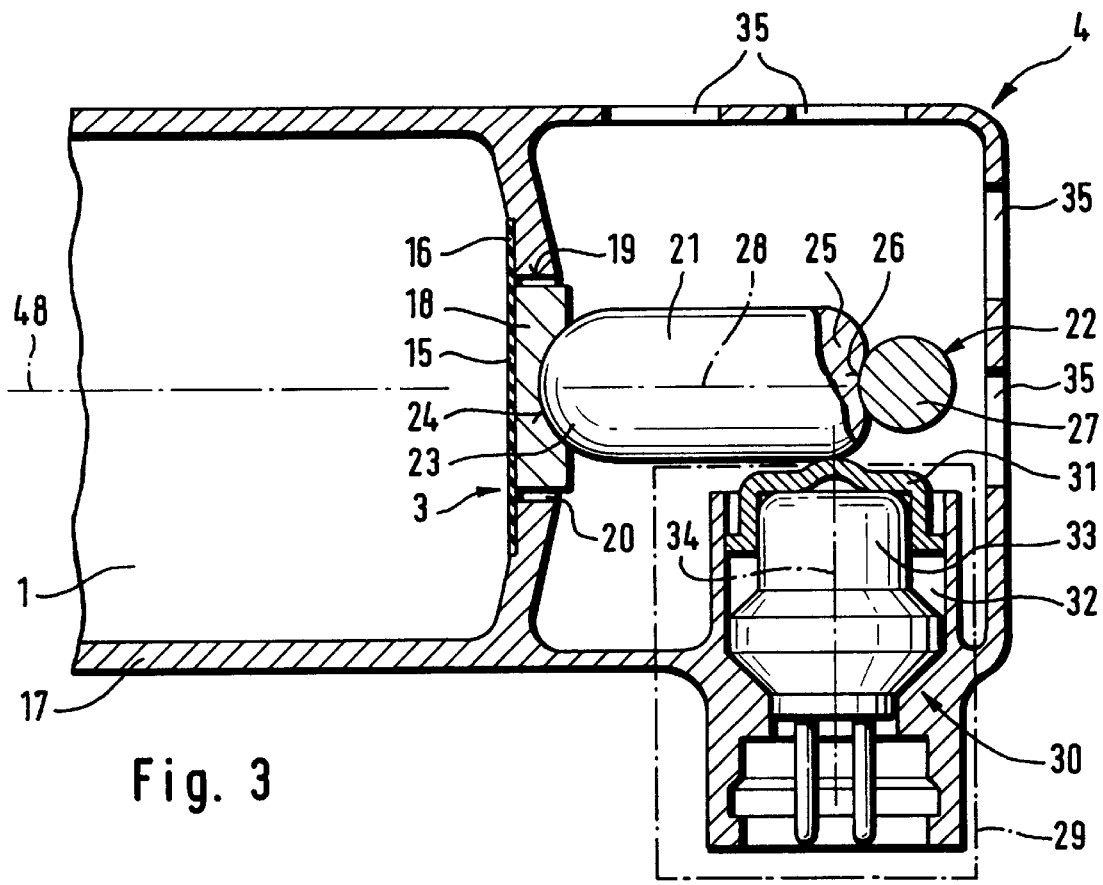
FIG. 3 is a cross-sectional schematic diagram of a first exemplary embodiment of the opening apparatus comprising a pyrotechnic tripping device.

As can be seen in FIGS. 2 and 3, fastened to the central discharge opening 3 of the pressure container 1 is a housing 4 that is securely connected to the container 1. The discharge opening 3 is preferably disposed coaxially with the central longitudinal axis 48 of the container 1.

Figure 5:
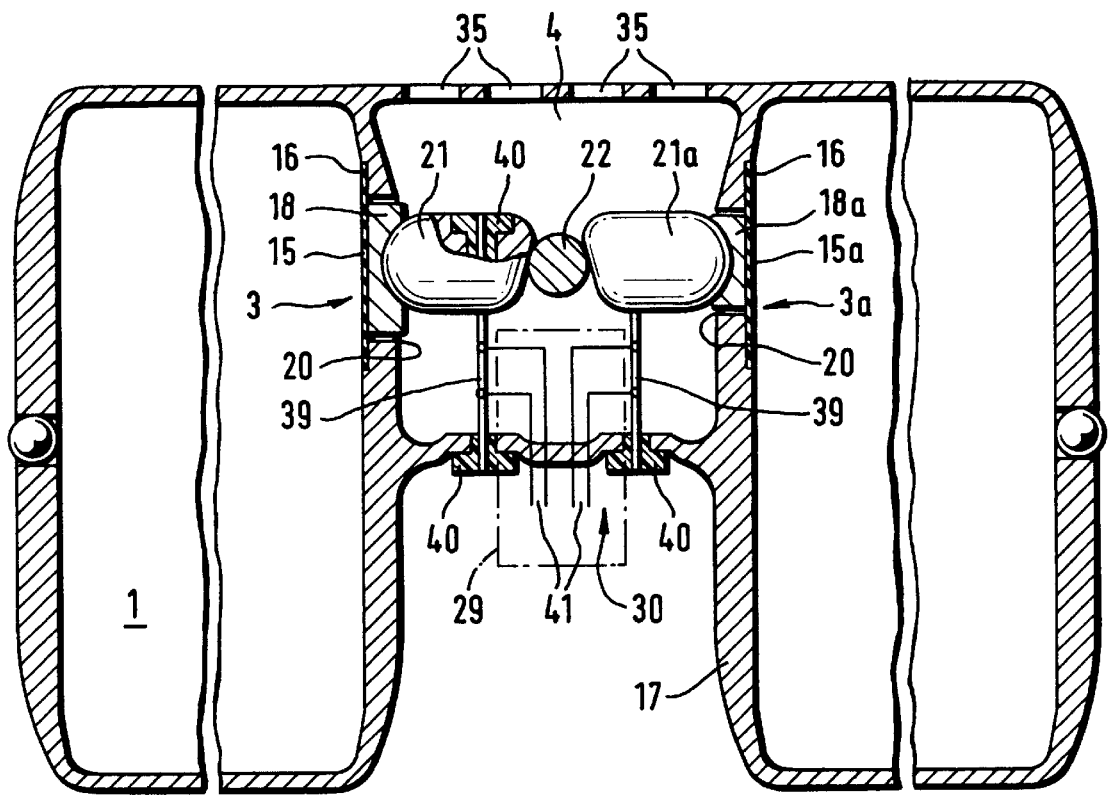
FIG. 5 is a schematic diagram of another principal member of a gas pressure container comprising a dual opening apparatus with an electric tripping device.
Figure 6:
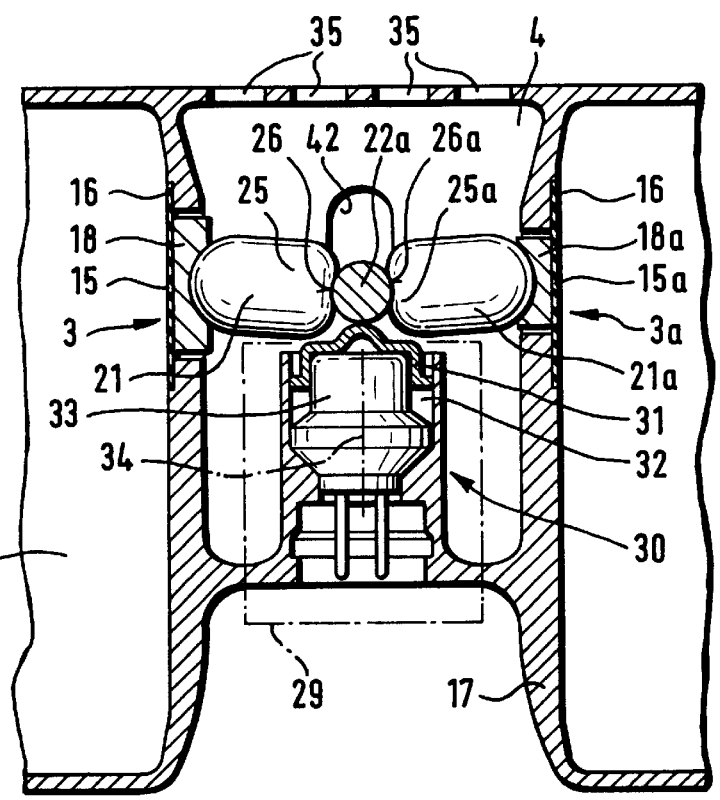
FIG. 6 illustrates a gas pressure container in accordance with FIG. 5 comprising a pyrotechnic tripping device.
Figure 7:
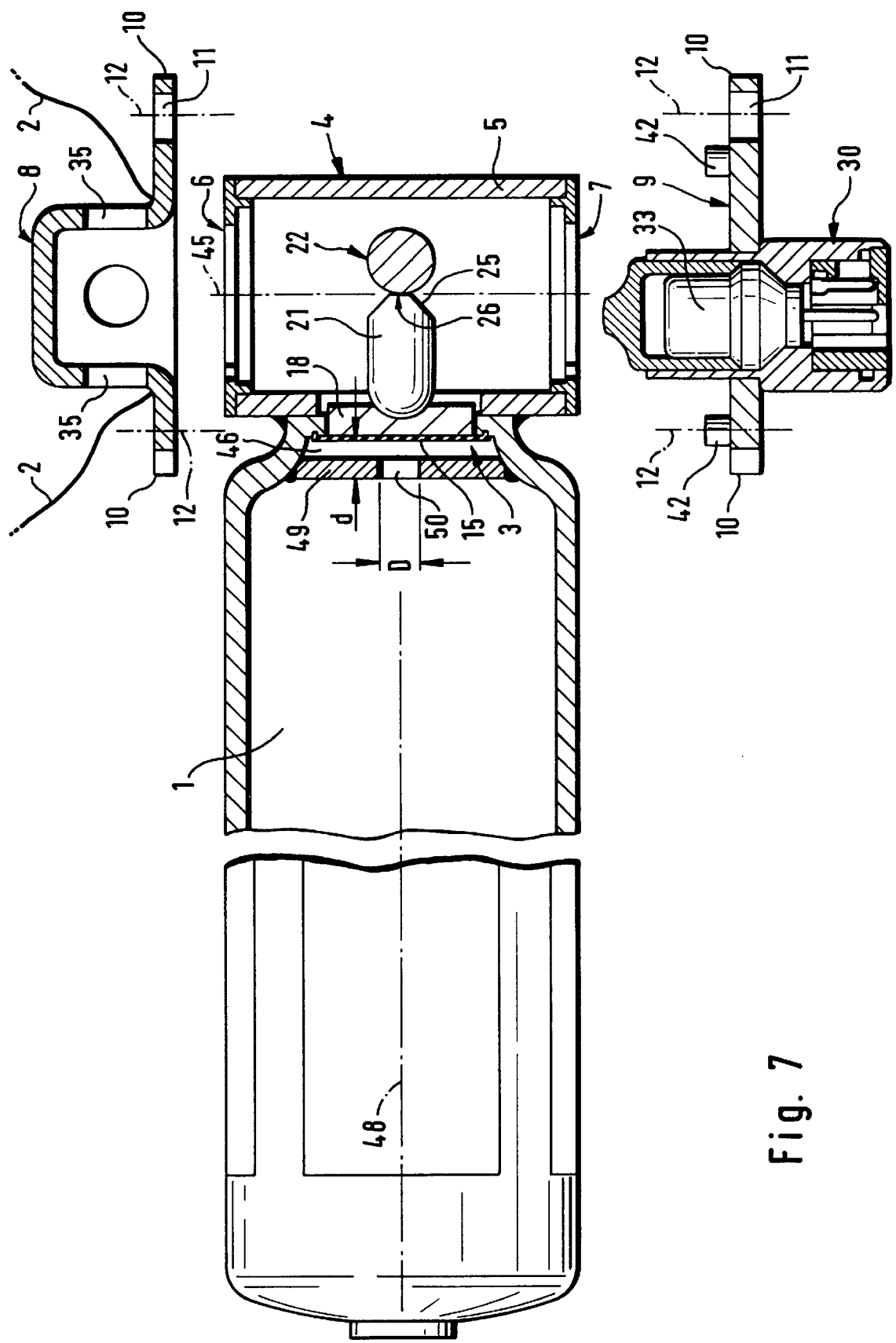
FIG. 7 is a section through a gas pressure container comprising throttling means.

FIGS. 1, 2, and 7 provide the structure of the housing 4 with greater precision, while FIGS. 3 through 6 merely contain sketches of the housing 4 and FIGS. 8 and 9 provide an alternative housing.

As illustrated particularly in FIG. 2, the housing 4 comprises a hollow principal member 5 comprising mutually opposing open ends 6 and 7 that are closed by means of the end plates 8, 9. As is evident from FIG. 1, the end plates 8 and 9 are larger than the ends 6 and 7 so that the end plates 8 and 9 overhang the principal member 5. Provided in the overhanging segments 10 are through-holes 11 for arranging, connecting or tie-rods 12. The end plates 8 and 9 are usefully embodied identically in terms of size such that the through-holes 11 of the mutually opposing end plates 8 and 9 are congruent and permit the arrangement of each tie15 rod 12. In order to assure positionally correct assembly of the end plates to the principal member 5, a groove 13 is provided on the side of the end plates 8 and 9 facing the principal member 5 for the edge 14 of the open ends 6 and 7. When the end plates 8 and 9 are assembled such that the ends 6 and 7 are closed, the edge 14 of the principal member 5 engages the groove 13 of each end plate and thereby assures positionally correct assembly with the principal member 5. This arrangement also assures precisely-aligned, mutually correct positioning of the through-holes 11 for installing the tie-rods 12. Three tie-rods 12 are provided around the circumference of the end plates 8, 9. One tie-rod 12 approximately intersects the center longitudinal axis 48 of the pressure container 1 in an extension of the pressure piece over the opening apparatus. The other two tie-rods 12 are disposed adjacent to the neck of the pressure container 1 to the left and right next to the housing 4. All three tie-rods 12 are disposed parallel to the longitudinal central axis 45 of the housing 4, which is perpendicular to the end plates 8 and 9.

The discharge opening 3 of the gas pressure container 1 opens approximately centrally into the housing 4, i.e., its principal member 5, which is rectangular in cross-section in the exemplary embodiment illustrated. Other cross-sectional shapes of the principal member 5 can be advantageous (FIG. 8). In order to obtain thrust-neutrality when the end plates 8 and 9 are uninstalled, the housing 4, i.e., principal member 5, is open on opposing sides 6, 7. The open sides 6, 7 preferably have the same area; the central axis perpendicular to each end 6, 7 is coaxial with the longitudinal central axis 45 of the principal member 5 or housing 4. The central longitudinal axis 48 of the pressure container 1 intersects the longitudinal central axis 45 of the housing 4 at a right angle.

The discharge opening 3 is closed by a sealing element 15 that is thin film in the exemplary embodiment illustrated and that is mounted on the side of the discharge opening 3 in the pressure container 1 that faces away from the housing 4. The sealing element 15 is preferably attached pressure-proof to the container housing 17 in the region of the film edge 16. Depending on the material the film is made of, its edge 16 can be joined or bonded to the container housing 17.

The sealing element 15 on the side facing the housing 4 is adjacent to a support disk 18 that is placed in the discharge opening 3.

The support disk 18 is disposed with radial play to the edge 19 of the discharge opening 3, thus forming an annular gap 20 that is closed on the container side by the sealing element 15. This annular gap 20 constitutes a pressure relief valve; the design of the annular gap is contrived in association with the material of the sealing element 15 such that at a prespecifiable pressure limit the sealing element 15 ruptures in the region of the annular gap so that the overpressure is discharged in a controlled manner through the annular gap 20 without the discharge opening 3 itself opening. FIGS. 8 and 9 illustrate a gas pressure container with no annular gap.

The support disk 18 is supported by a pressure piece 21 on a counterbearing or support 22 fixed in the housing so that the opening forces that act upon the sealing element 15 through the gas pressure in the container 1 are captured with certainty. The round end 23 of the pressure piece 21 is situated in a corresponding concave bearing or support 24 in the support disk 18, while the other end 25 of the pressure piece 21 has a slightly concave depressed rest 26 with which the pressure piece engages lightly on a bolt 27 constituting the counterbearing 22. The bolt 27 is held in opposing holes 47 in the principal member 5. The longitudinal axis 28 of the pressure piece 21 runs perpendicular to the support disk 18 and sealing element 15, preferably runs through the axis of the bolt 27, and coincides with the central longitudinal axis 48 of the container 1.

Arranged transverse to the longitudinal axis 28 of the oblong, preferably cylindrical pressure piece 21 is a tripping or triggering device 30 that is mounted in an end plate 9 of the housing, as shown in FIG. 2. The tripping device 30 together with the end plate 9 constitutes a unit 29 that is separate from the housing 4 and that can be installed independently.

The tripping device 30 essentially comprises an actuating piston 31 that is displaceably guided in a corresponding cylinder 32 transverse to the longitudinal axis 28, wherein arranged in the cylinder 32 is a pyrotechnic charge 33 that can be ignited electrically in a known manner. The actuating piston 31, adjacent to the counterbearing bolt 27 in the region of the end 25 rests on the pressure piece 21, wherein the longitudinal axis 34 of the cylinder 32 is preferably disposed at a right angle to the longitudinal axis 28 of the pressure piece 21.

As can be appreciated from FIG. 3, the support of the sealing element 15 by means of the support disk 18, the pressure piece 21, and the counterbearing 22 is stable and independent of the tripping device 30, the depressed rest 26 also contributing to this. The gas pressure container 1 can therefore be operationally pre-installed and filled without the arrangement of the tripping device 30 and without the pyrotechnic ignition charge 33 being arranged. This is advantageous during pre-assembly, shipping, and in final assembly. The end plate 9 with the tripping device 30 that contains the pyrotechnic charge 33 is not affixed to the principal member 5 in the manner described in the foregoing until final assembly, wherein the end plate 8 arranged at the other end 6 has discharge openings 35 through which the airbag 2 attached preferably to the end plate 8 is inflated.

Figure 4:
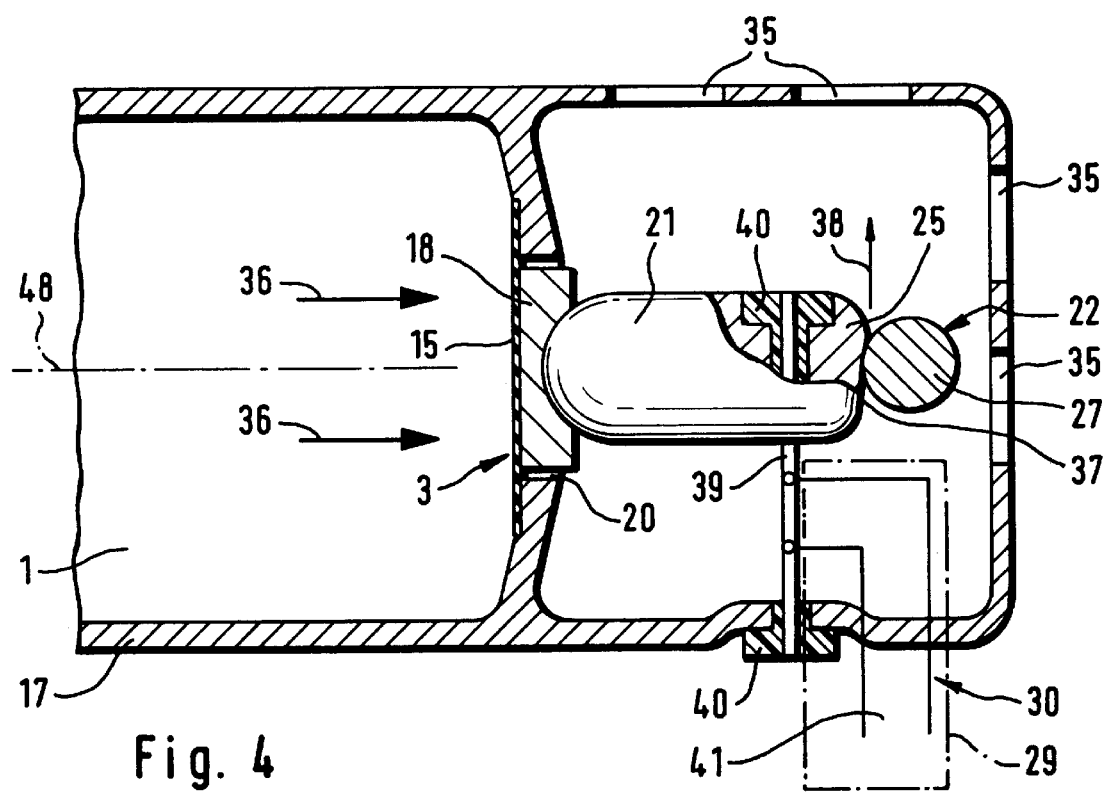
FIG. 4 is a schematic diagram of a second embodiment of the opening apparatus comprising a thermoelectric tripping device.

Instead of the pyrotechnic charge 33, a purely electric or thermoelectric tripping device 30 is provided in the exemplary embodiment in accordance with FIG. 4. Deviating from the support described in FIG. 3, the end 25 of the pressure piece 21 facing the bolt 27 inclines so that as a consequence of the forces acting in the direction of the arrows 36 on the pressure piece 21, as a result of the inclined plane 37 on the end 25 of the pressure piece 21, a resulting force 38 occurs which dislodges the pressure piece 21 from the counterbearing 22. The resulting force 38 is intercepted by an electrically conducting, mechanically loadable wire 39, wherein the wire 39 is fixed at one end in the pressure piece 21 by means of an insulating member 40 and is fixed at the other end in the housing 4 by means of an additional insulating member 40. Soldered to the wire 39 are connecting cables 41 to the tripping device by means of which the wire 39 heats up in fractions of a second and is thus thermally weakened so that the wire 39 ruptures under the resulting force 38, the end 25 of the pressure piece 21 is removed from the counterbearing 22, and the sealing element 15 is no longer supported so that the gas pressure in the container 1 suddenly opens the sealing element 15 and the airbag 2 is inflated through the discharge openings 35. It can be useful to embody the electrical tripping unit 30 like the pyrotechnic tripping unit 30 in FIG. 3 such that the unit is separate from the housing and can be installed independently.

The exemplary embodiment in accordance with FIG. 5 corresponds in principle to the tripping unit 30 described for the electric tripping unit in FIG. 4; identical reference numbers are therefore used for identical parts. The pressure gas container 1 in the exemplary embodiment in accordance with FIG. 5 comprises two round, separate individual containers; the housing 4 is provided in the center thereof. The torus-shaped ring has two discharge openings 3 and 3a, wherein discharge opening 3a is smaller than discharge opening 3. Arranged sealing elements 15 and 15a are supported in the same manner by support disks 18 and 18a and pressure pieces 21 and 21a against a common counterbearing 22. Provided for each support is a separate holding wire 39 so that the discharge openings 3, 3a can be opened at different times.

In order to obtain favorable inflation characteristics in the airbag 2, the discharge opening 3a of the one container is advantageously opened first in order then, after an interval of time, to open the larger discharge opening 3 of the other container for finally inflating the airbag.

The exemplary embodiment in accordance with FIG. 6 corresponds in principle to that in FIG. 5; identical reference numbers are therefore used for identical parts.

The two pressure pieces 21 and 21a are arranged at a common counterbearing 22, wherein support of each sealing element 15 and 15a corresponds to an articulated lever and is stable without the arrangement of the pyrotechnic tripping device 30. The ends 25 and 25a of the pressure pieces 21, 21a have depressed rests 26, 26a as described for the exemplary embodiment in accordance with FIG. 3. The counterbearing 22a is held movable in a longitudinal slot 42 of the housing 4, the actuating piston 31 of the pyrotechnic tripping device 30 engaging at the counterbearing 22a. When tripped, the piston pushes the counterbearing 22a through the dead center of the articulated lever arrangement out of the illustrated stable position, wherein the support for each of the sealing elements 15 and 15a is removed and the discharge openings 3 and 3a are opened.

The exemplary embodiment in accordance with FIG. 7 corresponds in structure to that in FIG. 2; identical reference numbers are therefore used for identical parts. The principal member 5 constituting the housing 4 is joined to the neck of the pressure container 1 and has opposing open ends 6 and 7. The end plate 9 has centering pins 42. The support disk 18 is disposed with just a little play in the discharge opening 3 so that a film that is not very pressure resistant can be employed as sealing element 15. Due to the small amount of play the support disk 18 has in the opening, the film is supported over substantially the entire opening cross-section of the discharge opening.

The opening cross-section, e.g., the diameter of the discharge opening 3, is selected in terms of size such that the gas pressure acts on the support disk 18 with great opening force so that when tripped and the pressure piece 21 is pushed away, immediate explosive opening of the discharge opening 3 is assured.

Advantageously the pressure container is filled with a helium mixture, particularly however primarily helium or another suitable inert gas that is not highly temperature sensitive and that at the same storage pressure has a high inflation speed, which can be utilized advantageously for very brief airbag inflation times.

Throttling means 49 are provided in front of the discharge opening 3 in the pressure container 1 in the direction of discharge in order to preclude mechanical damage to the airbag with certainty. In the exemplary embodiment illustrated, the throttling means 49 is an apertured plate, wherein the throttle plate 49 is joined gas-tight to the container wall at its [the plate's ]exterior edge, preferably completely. The throttle orifice 50 is usefully disposed symmetrically to the center longitudinal axis 48 of the container housing 17 and particularly in line with the discharge opening 3. The cross-section of the discharge opening 3 is larger, particularly larger by several times, than the cross-section of the throttle orifice 50. In the exemplary embodiment a ratio of 3:1 has been selected; a ratio of about 8:1 is preferable.

The throttle plate 49 is situated approximately in the region of the tapering to the bottleneck at a distance d approximately parallel to the sealing element 15 and support plate 18, so that formed in the bottleneck between the sealing element 15 and the throttle plate 49 is a pressure chamber 46 in which the same static pressure prevails as in the rest of the container housing 17. After the discharge opening is opened, the pressure drops and is then determined by the gases flowing through the throttle orifice 50. The distance d equals approximately half the diameter D of the throttle orifice 50.

It is useful when the end plate 8 having the discharge openings 35 is provided a cup-shaped depression that projects into the airbag as a dome and that ensures its secure attachment In the exemplary embodiment in FIGS. 8 and 9 the bottleneck comprising the throttle plate 49 and the discharge opening 3 and the sealing element 15 together with the principal housing 5 embody a pipe segment that is joined to a pressure container 1 at the one open end and that is closed at the other open end by means of a cap 8a that can be screwed on and off, that has discharge openings 35, and that projects like a dome into the airbag. The tripping device 30 is screwed as a component into the cylindrical wall of the pipe segment perpendicular to the central longitudinal axis 48 (FIG. 9), whereby the opening apparatus is complete.

The specification incorporates by reference the disclosure of priority document DE 197 39 375.6 of Sep. 9, 1997.

The present invention is, of course, in no way restricted to the specific disclosure of the specification and drawings, but also encompasses any modifications within the scope of the appended claims.

I claim:

1. An opening apparatus for a gas pressure container for inflating an airbag, comprising:
    a housing that is fixedly connected to said container and communicates with said container via a discharge opening thereof, wherein said housing includes a principal member that is connected to said container and has oppositely disposed open ends;
    a counterbearing disposed in said principal member;
    a sealing element for initially sealing said discharge opening;
    a pressure piece disposed in said principal member, wherein said sealing element is supported by said pressure piece on said counterbearing against opening forces acting on said sealing element via the gas pressure in said container;
    respective end plates for closing off said open ends of said principal member; and,
    a triggering device that when activated removes support for said sealing element so that said discharge opening is opened by gas pressure in said container for inflation of an airbag, wherein said triggering device is in the form of separate unit that is independently mountable on said housing and is held in one of said end plates, and wherein support of said sealing element is stable independent of said triggering device.

2. An opening apparatus according to claim 1, wherein said open ends of said principal member have approximately the same surface area.

3. An opening apparatus according to claim 1, wherein said triggering device is mounted in one of said end plates.

4. An opening apparatus according to claim 1, wherein said end plates extend beyond said principal member, wherein said end plates which are disposed at said open ends are interconnected by tie rods, and wherein an open edge of said principal member engages said end plate.

5. An opening apparatus according to claim 4, wherein said open edge of said principal member engages a receiving groove of said end plate.

6. An opening apparatus according to claim 1, wherein one of said end plates is provided with discharge openings for filling gas for said airbag.

7. An opening apparatus according to claim 6, wherein said airbag is secured to said one end plate.

8. An opening apparatus according to claim 1, wherein a support disk is disposed with radial play in said discharge opening, and wherein said sealing element is supported on said support disk in said container and seals said discharge opening on an interior side of said container.

9. An opening apparatus according to claim 8, wherein an annular gap is formed between an edge of said discharge opening and said support disk, wherein said annular gap is sealed by said sealing element and forms a pressure relief valve.

10. An opening apparatus according to claim 1, wherein said pressure piece is essentially locked and stable on said counterbearing.

11. An opening apparatus according to claim 10, wherein an end of said pressure piece that faces said counterbearing is provided with an arresting recess.

12. An opening apparatus according to claim 1, wherein said triggering device is provided with a pyrotechnic ignition charge.

13. An opening apparatus for a gas pressure container for inflating an airbag, comprising:
    a housing that is fixedly connected to a gas pressure container and communicates with said container via a discharge opening thereof, wherein said housing is predominantly filled with an inert gas;
    a counterbearing disposed in said housing;
    a sealing element for initially sealing said discharge opening, said sealing element comprising a concave portion;
    a pressure piece including a rounded end engaging said concave portion and disposed in said housing, wherein said sealing element is supported by said pressure piece on said counterbearing against opening forces acting on said sealing element via the gas pressure in said container;
    a triggering device that when activated removes support for said sealing element so that said discharge opening is opened by gas pressure in said container for inflation of an airbag, wherein support of said sealing element is stable independent of said triggering device; and
    a throttling means disposed upstream of said discharge opening relative to a direction of discharge of gas in said container through said discharge opening, wherein a cross-sectional area of said discharge opening is larger than a cross-sectional area of said throttling means, and wherein a pressure chamber is formed between said throttling means and said discharge opening.

14. An apparatus according to claim 13, wherein said gas pressure container is filled with helium.

15. An apparatus according to claim 13, wherein said cross-sectional area of said discharge opening is several times larger than said cross-sectional area of said throttling means.

16. An apparatus according to claim 13, wherein said cross-sectional area of said throttling means is arranged axially symmetrical in said pressure container 1.

17. An apparatus according to claim 13, wherein said throttling means is an apertured plate.

* * * * *